Jan 6, 1931.　　　G. S. GUERIN　　　1,787,677
CORN STALK CUTTER
Filed Dec. 13, 1926　　3 Sheets-Sheet 2
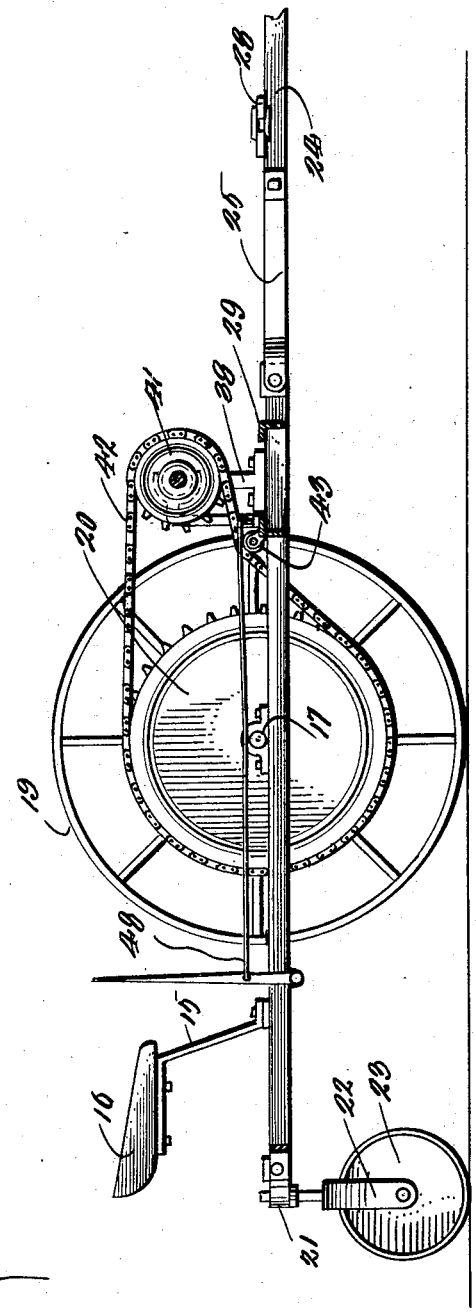
WITNESS
Inventor
GEORGE S. GUERIN
By
Attorney

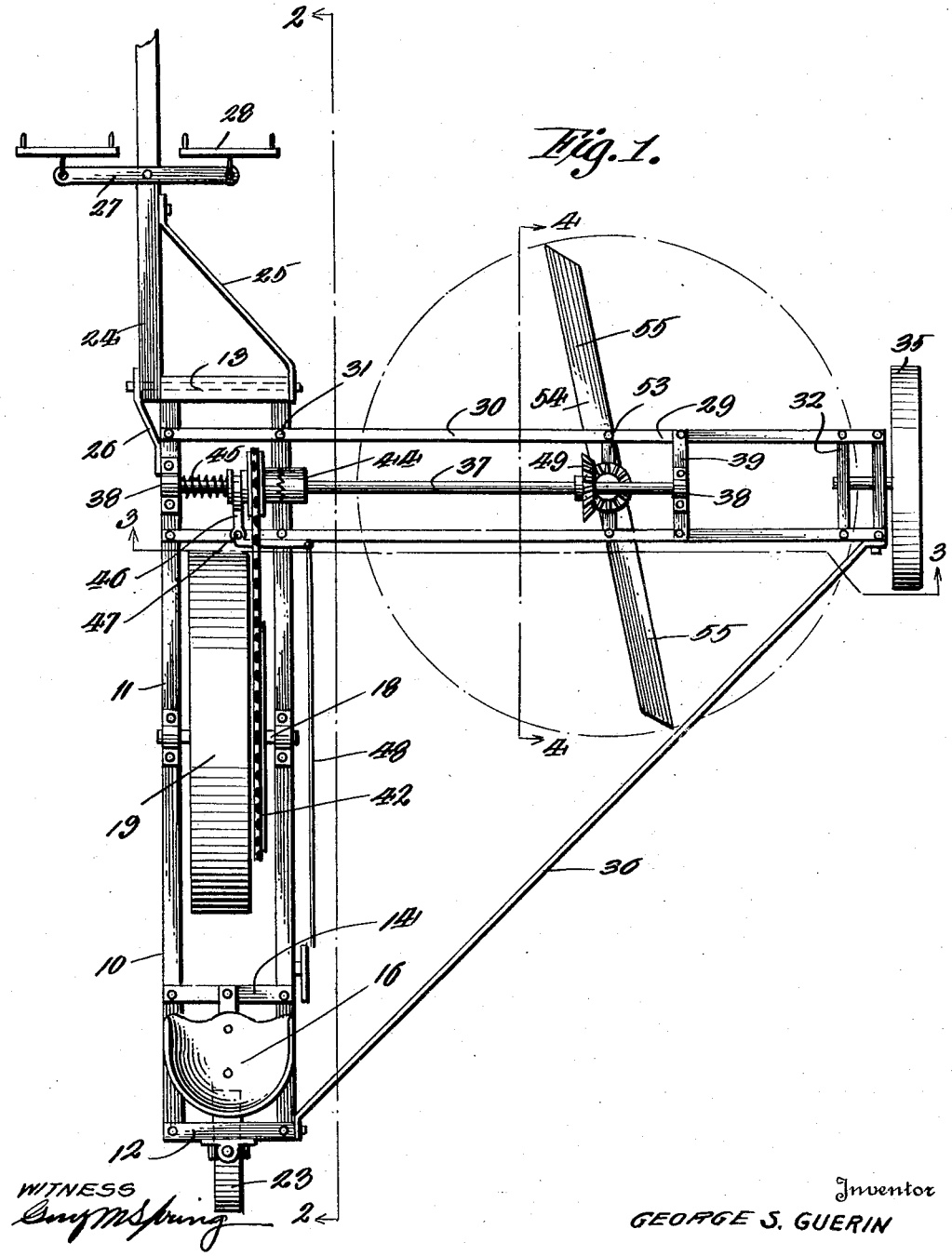

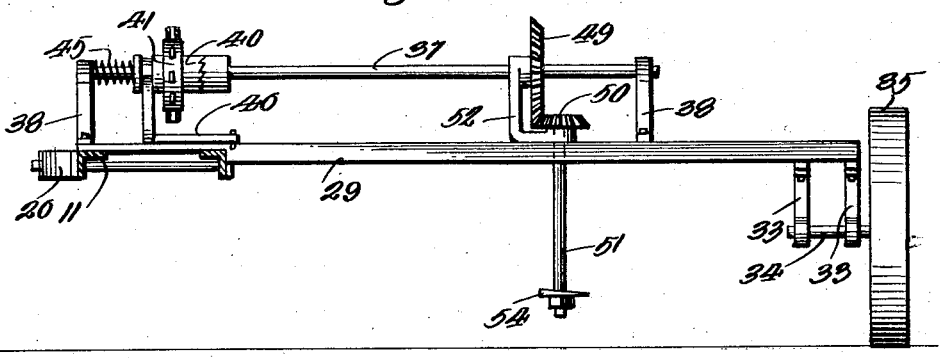
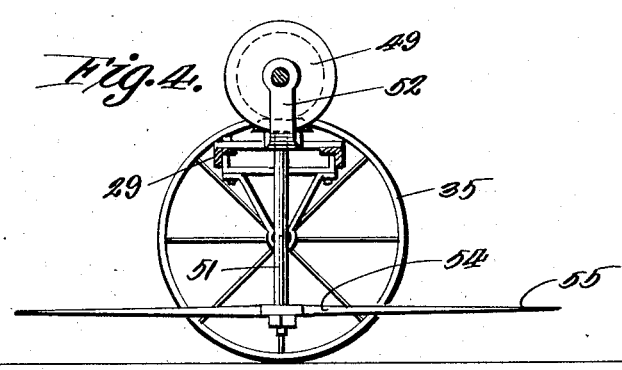

Patented Jan. 6, 1931

1,787,677

UNITED STATES PATENT OFFICE

GEORGE S. GUERIN, OF FARNAM, NEBRASKA

CORNSTALK CUTTER

Application filed December 13, 1926. Serial No. 154,632.

The present invention relates to improvements in agricultural machines, and has particular reference to an improved corn stalk cutter.

An important object of the invention is to provide a machine of the above character which is of simple and durable construction and efficient for the purpose of cutting corn stalks and the like.

Another object of the invention is the provision of a corn stalk cutting machine embodying a rotatable cutting blade which will be actuated by the traction wheel of the machine.

A still further object of the invention is the provision of a cutting machine of the above type which is designed particularly to permit convenient control of the cutting mechanism and operative movement of the machine.

Still another object of the invention is the provision of a cutting machine embodying a frame of such construction that the draft animals may readily move between the rows of corn during the cutting operations.

Still another object of the invention is the provision of a corn stalk cutting machine which can be manufactured at a relatively low cost and readily disassembled for storage and shipment.

Other objects and advantages of the invention will become apparent as the description progresses.

In the accompanying drawings, forming a part of this application, and in which like reference characters are employed to designate corresponding parts throughout the same:

Figure 1 is a top plan view of the machine constructed in accordance with my invention, Figure 2 is a front-to-rear sectional view taken on the line 2—2 of Figure 1, Figure 3 is a vertical transverse sectional view taken on the line 3—3 of Figure 1, and Figure 4 is a longitudinal sectional view taken on the line 4—4 of Figure 1.

Referring to the drawings, wherein for the purpose of illustration, is shown the preferred embodiment of my invention, the numeral 10 generally designates the main frame of the machine, this frame being of elongated rectangular formation and including a pair of longitudinal side beams 11, a rear transverse beam 12, and a forward transverse beam 13. Secured transversely on the longitudinal beams 11 adjacent the rear transverse beam 12 is a seat supporting beam 14 to the center of which is rigidly secured a seat supporting standard 15. A conventional type of seat 16 is bolted upon the standard 15 and supported in an elevated position above the frame.

Secured upon the intermediate portions of the longitudinal frame beams 11 in transverse alignment are a pair of journal bearings 17 rotatably supporting a transverse axle 18. A relatively large traction wheel 19 is rigidly secured upon the axle 18 and disposed between the longitudinal frame beams 11, a relatively large sprocket wheel 20 being secured on one side of the wheel 19 as shown in Figure 2.

A swivel bracket 21 is secured to the rear side of the transverse frame beam 12 and rotatably supports the vertical stem of a wheel yoke 22. A comparatively small ground wheel 23 is rotatably mounted in the yoke 22, this wheel being arranged for turning movement to guide the movement of the machine.

Secured to the forward end of the frame 10 at one side of the forward transverse beam 13 is a draft tongue 24, braced in position by an angular brace bar 25 and secured against lateral displacement by an offset bar 26. A transverse draft bar 27 is pivotally mounted on the tongue 24, single trees 28 being connected to the ends of the draft bar for convenient attachment of draft animals.

Secured to the forward portion of the frame 10 and arranged for detachable connection therewith is an auxiliary cutter frame 29 extending laterally at right angles to the main frame at one side thereof. This auxiliary frame embodies a pair of longitudinal frame beams 30 preferably formed of angle iron and extending in parallel positions. The inner ends of the beams 30 are rigidly secured to the main frame by bolts 31. A pair of parallel brace bars 32 are secured to the outer ends of the beam 30 to support downwardly projecting brackets 33. A stub-axle 34 is secured in the lower ends of the brackets 33, and a ground wheel 35 mounted on the outer end of the axle. The auxiliary frame 29 is braced in position by means of a brace rod 36 secured to the rear end of the main frame 10 and to the outer end of the auxiliary frame and projecting at an angle therebetween.

An essential feature of the present construction resides in the provision of a rotatble cutter carried by the auxiliary frame and driven by gearing from the traction wheel 19. With this in mind, I provide a longitudinal shaft 37 journaled in bearings 38 secured upon the outer longitudinal beam of the main frame and upon a beam 39 mounted on the intermediate portion of the auxiliary frame. Loosely mounted on the inner end of the shaft 37 for rotary movement is a clutch sleeve 40, the outer end being formed with clutch teeth while an annular groove is formed adjacent the inner end. A sprocket gear 41 is mounted on the intermediate portion of the sleeve 40 and secured thereto, this sprocket gear being in longitudinal alignment with the sprocket gear 20 secured to the traction wheel 19. A drive chain 42 is trained over the sprockets 20 and 41 for simultaneous operation of the sprockets and is supported out of contact with the frame by means of a roller 43. Rigidly secured to the shaft 37 adjacent its inner end is a complementary clutch sleeve 44 having clutch teeth adapted to engage the teeth formed on the coacting sleeve 40 for operation of the shaft 37. The slidable clutch sleeve 40 is normally urged into engagement with the fixed sleeve 44 by means of a compression spring 45 positioned about the inner end of the shaft 37 between the bracket 38 and the inner end of the movable sleeve.

As it is desirable to control the operative movement of the shaft 37 from the seat 16 of the vehicle, an angle lever 46 is provided, this lever being pivoted upon the auxiliary frame by means of a pivot pin 47. One arm of the lever 46 is provided with a yoke engaging the annular groove formed in the slidable clutch sleeve while the other arm projects laterally at one side of the main frame. A connecting rod 48 is pivotally connected with the lever 46 and extends longitudinally rearwardly and connected to a hand lever 48' upon the frame 10. This construction will enable the operator to readily actuate the slidable clutch sleeve so as to disengage the clutch and prevent rotary movement of the shaft 37 when necessary. Normally the clutch is engaged by the action of the spring 45 so that the shaft 37 will be continuously operated during the rotary movement of the traction wheel 19.

As shown to advantage in Figures 1 and 3, a beveled pinion 49 is fixed on the intermediate portion of the shaft 37 adjacent its outer end, this pinion being in mesh with a complementary pinion 50 secured on the upper end of a vertical cutter shaft 51. The upper end of the shaft 51 is journaled in an angular bracket 52 firmly secured on a cross beam 53 mounted on the auxiliary frame. The lower end of the vertical shaft 51 terminates immediately above the ground and carries a horizontally disposed cutter 54. It will be noted, that the cutter 54 is secured to the shaft 51 at its center and comprises a pair of beveled cutting blades 55. This gearing is designed to cause rapid rotary movement of the cutter 54 during the travel of the machine.

In operation, the machine is drawn between the rows of corn and the cutter in rotating severs the stalks as the machine is drawn along the rows. In this manner, the corn stalks will be properly and quickly severed so as to greatly facilitate this operation. Thus, it is apparent that an extremely simple and compact machine has been devised particularly intended for cutting corn stalks and the like and presenting a structure which can be easily disassembled for storage or for shipment.

It is to be understood that the form of my invention herewith shown and described is to be taken as the preferred example of the same, and that various changes as to the shape, size and arrangement of parts may be resorted to without departing from the spirit of the invention or the scope of the subjoined claim.

Having thus described my invention, I claim:

In a device of the class described, an elongated main frame, a combined supporting and drive means on said frame, an elongated secondary frame extending transversely across the front portion of said main frame and being fixedly connected thereto, an elongated drive shaft extending longitudinally of said auxiliary frame and being journaled on said main frame as well as on said secondary frame, whereby said shaft will be held steady, a cutting means on said secondary frame and being associated with said shaft, whereby as the shaft is rotated the cutting means will be operated, a clutch sleeve fixed on said shaft in alignment with said main frame, a clutch sleeve slidable along said shaft, means connecting the slidable clutch sleeve to said drive means, and means for moving said last-mentioned clutch sleeve into and out of engagement with said first-mention clutch sleeve, as and for the purposes set forth.

In testimony whereof I affix my signature.

GEORGE S. GUERIN.